United States Patent [19]
Buckley

[11] Patent Number: 6,163,809
[45] Date of Patent: Dec. 19, 2000

[54] SYSTEM AND METHOD FOR PRESERVING DELIVERY STATUS NOTIFICATION WHEN MOVING FROM A NATIVE NETWORK TO A FOREIGN NETWORK

[75] Inventor: David Buckley, Bellevue, Wash.

[73] Assignee: Microsoft Corporation, Redmond, Wash.

[21] Appl. No.: 08/986,648

[22] Filed: Dec. 8, 1997

[51] Int. Cl.[7] .............................. G06F 15/16; G06F 13/38
[52] U.S. Cl. ......................... 709/237; 709/232; 709/204; 709/206; 709/246
[58] Field of Search .................................... 709/206, 204, 709/232, 246, 237, 219; 379/88

[56] References Cited

U.S. PATENT DOCUMENTS

| | | | |
|---|---|---|---|
| 5,684,862 | 11/1997 | Finnigan ............................. | 379/88.22 |
| 5,742,668 | 4/1998 | Pepe et al. ........................... | 379/88.22 |
| 5,790,790 | 8/1998 | Smith et al. ........................... | 709/206 |
| 5,822,526 | 10/1998 | Waskiewicz ............................ | 709/206 |
| 5,893,099 | 4/1999 | Schreiber et al. ..................... | 709/204 |
| 6,006,258 | 12/1999 | Kalajan .................................. | 709/219 |

OTHER PUBLICATIONS

Moore et al., "An Extensible Message Format for Delivery Status Notifications", University of Tennessee, pp. 1–39, Jan. 1996.

*Primary Examiner*—Mark H. Flinehart
*Assistant Examiner*—Almari Romero
*Attorney, Agent, or Firm*—Workman Nydegger & Seeley

[57] ABSTRACT

This invention is directed to systems and methods for preserving delivery status notification information as a message transits from one type of network to another type of network. For incoming messages, the present invention takes a two-pronged approach whereby the delivery status notification information accompanying the incoming message is 1) mapped to the closest available options supported by the network and 2) preserved so that the original information may be fully recovered without loss at a later time. When messages are delivered within the network, the mapped delivery status notification information will generate the closest delivery status notifications supported by the network. For outgoing messages, the preserved delivery status notification information is extracted and used to set delivery status notification options. If the message is being transferred to the same type of network that originated the message, using the preserved delivery status notification information results in the original options being fully restored without loss of any kind. If the message is being sent to a different network than that generated the message, using the original delivery status notification information will result in the closest available options being selected. This two-pronged approach taken by the present invention minimizes the mapping losses under all circumstances.

13 Claims, 9 Drawing Sheets

SYSTEM AND METHOD FOR PRESERVING DELIVERY STATUS NOTIFICATION WHEN MOVING FROM A NATIVE NETWORK TO A FOREIGN NETWORK

BACKGROUND OF THE INVENTION

1. The Field of the Invention

The present invention relates to systems and methods for translating delivery status notification information when messages are transferred from one type of network to another. More specifically, the present invention relates to systems and methods that translate delivery status notification information in such a manner that when a message transits from one network to another and then back again, the delivery status notification information on the returned message is the same as the original message.

2. Prior State of the Art

Although computers were once isolated and had minimal or little interaction with other computers, computers today interact with a wide variety of other computers through Local Area Networks (LANs), Wide Area Networks (WANs), dial-up connections, and so forth. With the widespread growth of the Internet, connectivity between computers is becoming more important and has opened up many new applications and technologies completely unthought of just a few short years ago. The growth of large scale networks and the widespread availability of low-cost personal computers has fundamentally changed the way that many people work, interact, communicate, and play.

Electronic communications among users of various computer systems have been known for many years. Many companies have developed internal electronic mail systems that allow email commnunication between various computers connected to corporate LANs or other networks. Many companies have reengineered their procedures and processes to take maximum advantage of email communications in order to provide a convenient mechanism for exchanging information and documents, thus reducing the handling of paperwork and speeding the flow of information between and among employees of various departments. With the advent of widespread connectivity offered by the Internet and the availability of email communications over the Internet, many companies are expanding the scope of email communications and connecting internal corporate LANs to the Internet or other wide area networks so that electronic communications can flow between various departments or divisions, clients, customers, employees, and others separated by large distances.

One mechanism to connect one network, such as a LAN, to another network, such as the Internet or other WAN, is to provide a gateway between the two networks. The gateway typically functions as an intermediary which takes messages or packets from one network and performs any protocol or other translations required to allow the message to flow through to the other network. As is expected, when email messages or other communications pass from one type of network to another there is often not a direct correlation between the features, protocols, and other information supported by the two networks. Thus, moving an email message from one type of network to another may require some translation or modification of certain information in the email message. Such modifications or translations are typically not required for the content of the message but, rather, involve other information carried along with the email message to provide information or features for delivery of the message.

As one example of information that may need translation, many networks support the basic concept of delivery status notification. Delivery status notification is sometimes referred to as a delivery receipt. Delivery status notification is intended to provide some feedback regarding the ultimate status of the delivery of the email message. For example, a sender of an email message may desire notification when the email message is delivered to its intended destination. As another example, the sender of an email message may desire notification if the message was never delivered or if delivery was somehow delayed beyond a certain point.

Because of the various standards supported by different networks, when email messages flow between networks there is often not a direct correlation between the types of delivery status notification options supported by different types of networks. As a simple example, the widespread pervasiveness of the Internet has convinced many of the importance of having access to, or transferring information over, the Internet. However, until recently no standard existed which specified what or how delivery status notification information was added or supported by the SMTP protocol used by the Internet. This changed with the promulgation of RFC 1891 which defines an extension to the SMTP protocol which allows an SMTP client to specify various delivery status notifications. For example, under RFC 1891 a client can specify that delivery status notification should be generated under certain conditions, whether such notifications should return the content of the message, and additional information, which is to be returned with a delivery status notification, that allows the sender to identify both the recipient for which the delivery status notification was issued, and the transaction in which the original message was sent. Thus, when connecting a non-SMTP networks to the Internet or other SMTP network, care must be taken to properly address how the delivery status notification options supported by the SMTP network are translated and handled when messages flow into or out of the non-SMTP network.

When transferring a message from one network to another, it is often common practice to attempt to preserve, as far as possible, the original sending options of the message. Thus, when a message having delivery status notification information passes from an SMTP network into a non-SMTP network, it is often desirable to translate the delivery status notification information into the closest option supported by the non-SMTP network. Such a translation process, however, invariably leads to data loss. For example, RFC 1891 specifies delivery status notification that is returned when delivery is delayed. X.400-based networks, however, have no concept of delivery status notification for delayed delivery. Many implementations of components that connect one type of network to another simply map the components to the closest available options and ignore information that cannot be mapped. This approach, however, can create unexpected problems.

As an example of the problems that may arise when information from one network is mapped into the closest available option and unmappable information is ignored may be illustrated by considering what happens to a message that passes from an SMTP network into a non-SMTP network and then passes back into the SMTP network. If the original message had delivery status notification information that requested notification when delivery was delayed, when the message passed into an X.400 network this information would be stripped and lost. If the message then subsequently returned to an SMTP network where option was supported, no such notification would be generated. It would, therefore, be highly desirable to implement mechanisms that restored all delivery status notification information to a message that passed into a foreign network and then returned from the foreign network back into the originating network. It would also be desirable to provide systems and methods that allowed such restoration to take place in a manner where the original message and the restored message where indistinguishable when examining the restored characteristics.

SUMMARY AND OBJECTS OF THE INVENTION

The problems in the prior state of the art have been overcome by the present invention which is directed to systems and methods for converting delivery status notification information from a format used by a first network into a format used by a second network. The conversion is performed in such a way that if the message is forwarded from the second back into the first network, the original delivery status notification information is restored to the same state as it was when the message was received from the first network.

When a message transits from one network to another, any delivery status notification information needs to be translated from a format that is supported by the originating network into a format supported by the destination network. Due to the different standards of various networks, such a translation process inevitably leads to some amount of data loss. For example, an SMTP network implementing RFC 1891 would have delivery status notification information suitable for generating a notification when delivery has been delayed. However, an X.400 network provides no such support. Therefore, the general approach would be to simply eliminate delivery status notification information relating to delayed delivery notification. The problem with eliminating delivery status information during such a translation process is that usually at the time the message enters the network it is impossible to tell whether the final delivery destination will be within the network or within a different network. Thus, it is possible that a message would enter an X.400 network from an SMTP network only to transit through the X.400 network back into the same or a different SMTP network. If delayed delivery notification information was stripped when transited the X.400 network, it would not be available when the message passed from the X.400 network into the SMTP network, even though the SMTP network supports such delivery status notification.

In order to prevent loss of information during transiting of a network, the present invention defines a mechanism whereby delivery status notification information is both translated into the closest option supported by the network and preserved in such a manner that the original delivery status notification information may be recovered without loss should the message pass into a network where different delivery status notification options are supported.

This dual approach may take one of many forms. In one form, when a message is received from another network, the delivery status notification information that accompanies the message will be mapped into the closest option supported by the network. In addition, however, the original delivery status notification information is preserved in such a manner that the original delivery status notification information may be transferred with the message within the network in a manner that is transparent to the network. In other words, the preserved delivery status notification information is carried along with the message but does not cause the network to generate delivery notifications.

If the message is transferred out of the network, the original delivery status notification information can be recovered from its preserved form and used to set the delivery status information for the new network. Thus, if a message transits a network only to return to the original network, the delivery status notification information may be fully recovered and restored to its original form. If a message transits the network only to be passed into a third type of network, then using the original delivery status notification information to set the options for the third type of network will create delivery notifications that most closely match those requested by the original sender.

RFC 1891, a specification for an extension to SMTP that defines delivery status notification options, describes both per-message and per-recipient delivery status notification options. Per-message options include, for example, the ability to specify whether the entire message is returned with the delivery status notification or whether only the header of the original message is returned. Per-recipient options include the option to identify for each recipient, whether a message has been delivered, whether delivery never occurred, or whether delivery has been delayed. The sender also has the option of requesting that no delivery status notifications be returned.

In one embodiment of the present invention, systems and methods to implement a mapping from the deliver status notification specifications described in RFC 1891 are implemented. This embodiment is used to map and preserve both per-message and per-recipient delivery status notification information. Per-message options are mapped to the closest per-message option supported by the destination network. They are also preserved in a manner that allows the per-message options to be recovered. Per-recipient options are also mapped to the closest options supported by the destination network and preserved in a manner that allows the individual per-recipient information to be recovered.

It is, therefore, an object of the present invention to provide systems and methods for both preserving original delivery status notification information and translating the delivery status notification information into the closest option supported by the receiving network. This allows deliveries that occur within the receiving network to generate notifications that most closely match those requested by the sender. Such an approach also allows the original delivery status notification information to be recovered should delivery take place outside the receiving network. If delivery takes place outside the receiving network, the original delivery status notification information may be used to set delivery status options that most closely match those requested by the sender.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

The invention is described below by using diagrams to illustrate either the structure or processing of embodiments used to implement the system and method of the present invention. Using the diagrams in this manner to present the invention should not be construed as limiting of its scope. The present invention contemplates both methods and systems for the hierarchical storage of data. The embodiments of the present invention may comprise a special purpose or general purpose computer comprising various computer hardware, as discussed in greater detail below.

Embodiments within the scope of the present invention also include computer readable media having executable instructions or data fields stored thereon. Such computer readable media can be any available media which can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired executable instructions or data fields and which can accessed by a general purpose or special purpose computer. When information is transferred or provided over a network or other communications connection to a computer, the computer properly views the connection as a computer-readable medium. Thus, such a connection is also properly termed a computer-readable medium. Combinations of the above should also be included within the scope of computer readable media. Executable instructions comprise, for example, instructions and data which cause a general purpose computer, special purpose computer, or special purpose processing device to perform a certain function or group of functions.

Figure 1:
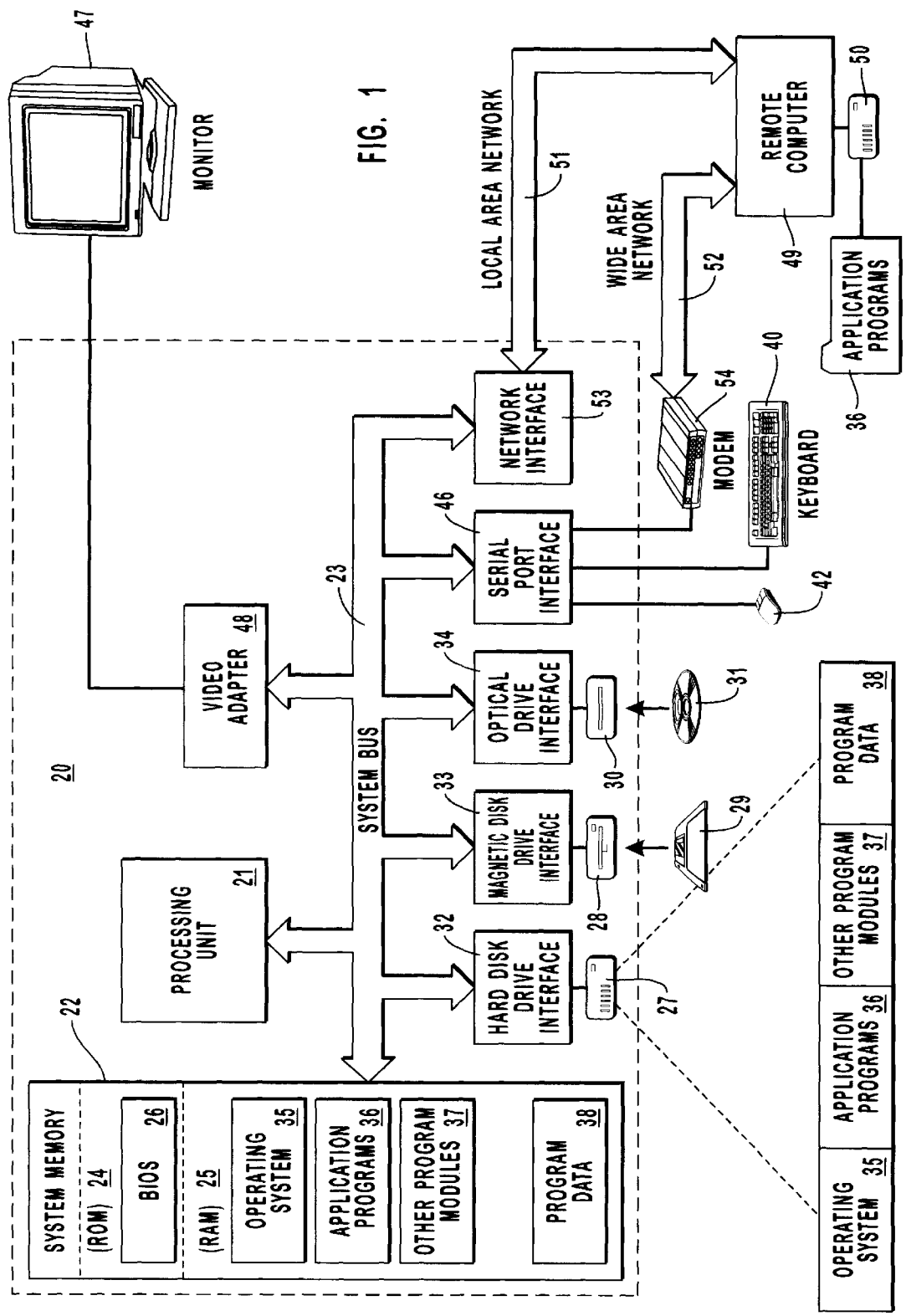
FIG. 1 is an example system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mairame computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computer 20, such as during start-up, may be stored in ROM 24. The computer 20 may also include a magnetic hard disk drive 27 for reading from and writing to a magnetic hard disk, not shown, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer readable instructions, data structures, program modules and other data for the computer 20. Although the exemplary environment described herein employs a magnetic hard disk 27, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through input devices such as a keyboard 40 and pointing device 42. Other input devices (not shown) may include a microphone, joy stick, game pad, satellite dish, scanner, or the like. These and other input devices are often connected to the processing unit 21 through a serial port interface 46 that is coupled to system bus 23, but may be connected by other interfaces, such as a parallel port, game port or a universal serial bus (USB). A monitor 47 or other type of display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52 that are presented here by way of example and not limitation. Such networking environments are commonplace in offices enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Figure 2:
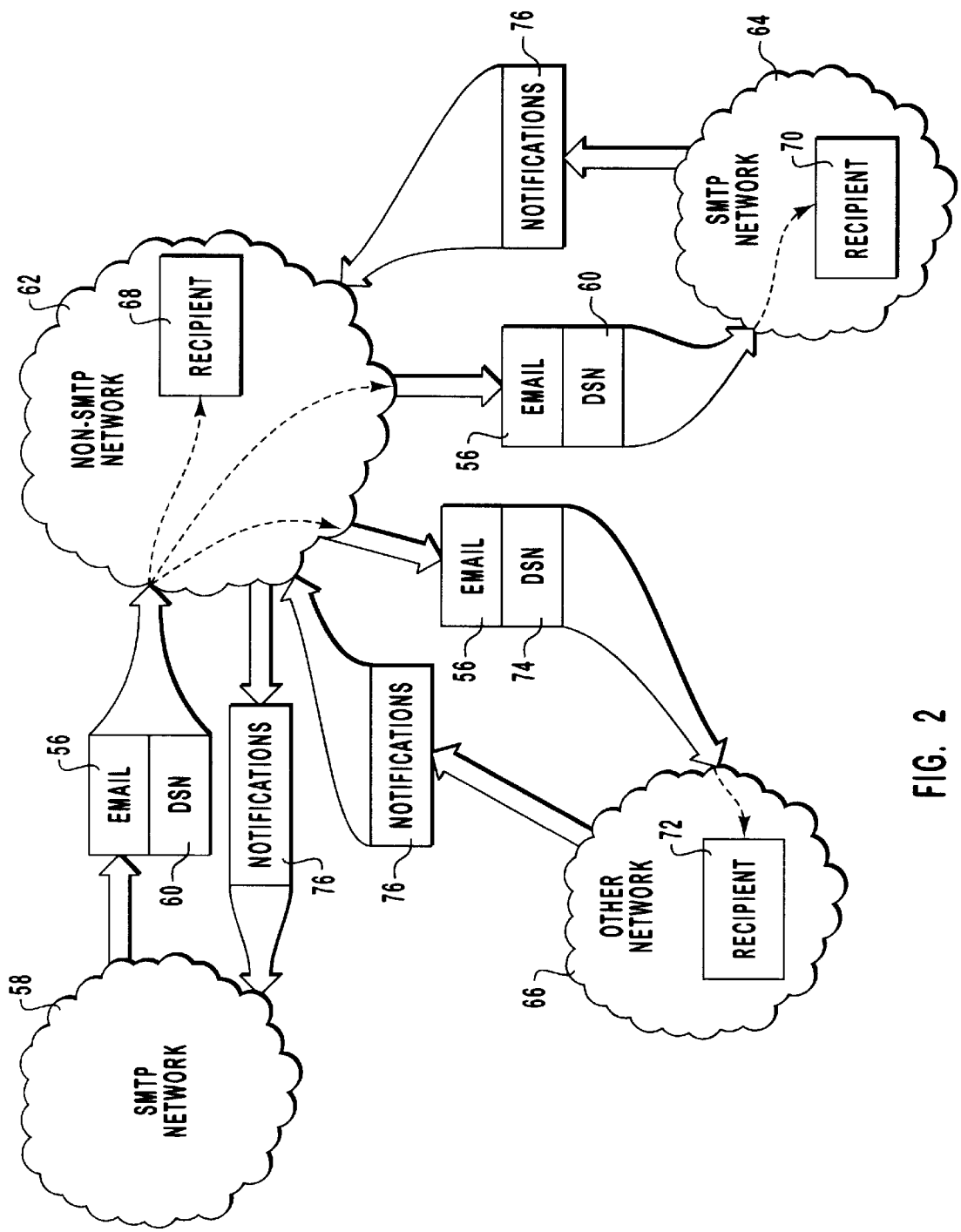
FIG. 2 is a top-level diagram illustrating messages originating in one network and being delivered to other networks.

Referring next to FIG. 2, a diagram illustrating the interconnection of various types of networks and messages being delivered within those networks is illustrated. Although FIG. 2 presents an example using SMTP and other types of networks, such an example should not be construed as limiting the scope of this invention. In FIG. 2 and in other locations, SMTP or other types of networks are utilized to provide specific examples of representative embodiments. The present invention can, however, be utilized wherever messages flow between one type of network and another type of network and all should be considered to be within its scope.

FIG. 2 illustrates an email message 56 generated within a network, such as SMTP network 58. Email 56 has associated therewith delivery status notification (DSN) 60 information. DSN 60 may conform, for example, to the DSN information specified in RFC 1891. For other types of networks, DSN 60 would correspond to whatever delivery status notification information was supported by the network and requested by the sender.

In FIG. 2, email message 56 is forwarded to non-SMTP network 62. In order to fulfill the intent of the sender of email message 56, DSN 60 will need to be translated or mapped into the delivery status notification options supported by non-SMTP network 62. As previously explained, one problem with such mapping is that at the time such mapping occurs it is generally not known whether delivery of email message 56 will occur within non-SMTP network 62 or whether final delivery will take place outside of non-SMTP network 62 such as within SMTP network 64 or other network 66. Delivery may also take place in more than one network. If DSN 60 includes per-recipient notification information then DSN 60 may need to be mapped to more than one type of network, so that delivery status notifications may be generated both from recipients in non-SMTP network 62 and in any other network where email 56 may be delivered. This scenario is illustrated in FIG. 2 with recipient 68 in non-SMTP 62, recipient 70 in SMTP network 62 and recipient 72 in other network 66.

Many scenarios may cause a situation such as that illustrated in FIG. 2 where a single email message, such as email message 56, is passed to different recipients in one or more different networks. For example, perhaps email message 56 arrives at non-SMTP network 62 with a distribution list as the ultimate destination. Such a distribution list may not be expanded until email message 56 is received within non-SMTP network 62. Once the distribution list is expanded, however, the ultimate recipients of the message may reside in different networks so that email message 56 must be forwarded to the various recipients. As another example, perhaps the only routing path from SMTP network 58 to recipient 70 or 72 lies through non-SMTP network 62. In these situations, email message 56 must be transferred through non-SMTP network 62 prior to ultimate delivery to its intended recipient.

According to the present invention, when an email message is received by a network, any associated DSN information is preserved so that it may be recovered in its entirety. When email message 56 is forwarded through non-SMTP network 62 into SMTP network 64, DSN information 60 is recovered and included with email message 56. When, however, email message 56 is transferred to other network 66, assuming other network 66 is not an SMTP network, then DSN information 60 would be translated into the closest approximation supported by other network 66 as illustrated by DSN information 74. As explained below, the mapping of DSN information when an email message is forwarded through one network to another generally occurs as the email message leaves the network. In addition, since the original DSN information is preserved by the present invention, the original DSN information may be recovered and used as the bases for the mapping. This eliminates any mapping losses that may have occurred when the message was received from the originating network.

In FIG. 2 notifications that are sent back to the sender in accordance with the DSN information are illustrated by notification 76. Although FIG. 2 illustrates all notifications as being the same and as being returned either from non-SMTP network 62 or through non-SMTP network 62, such is given by way of example only and notifications sent from different recipients may be different, depending upon the option supported by the particular network. In addition, the return path may not necessarily pass through non-SMTP network 62. Such may be the case where SMTP network 64 is the same network as SMTP network 58.

Figure 3A:
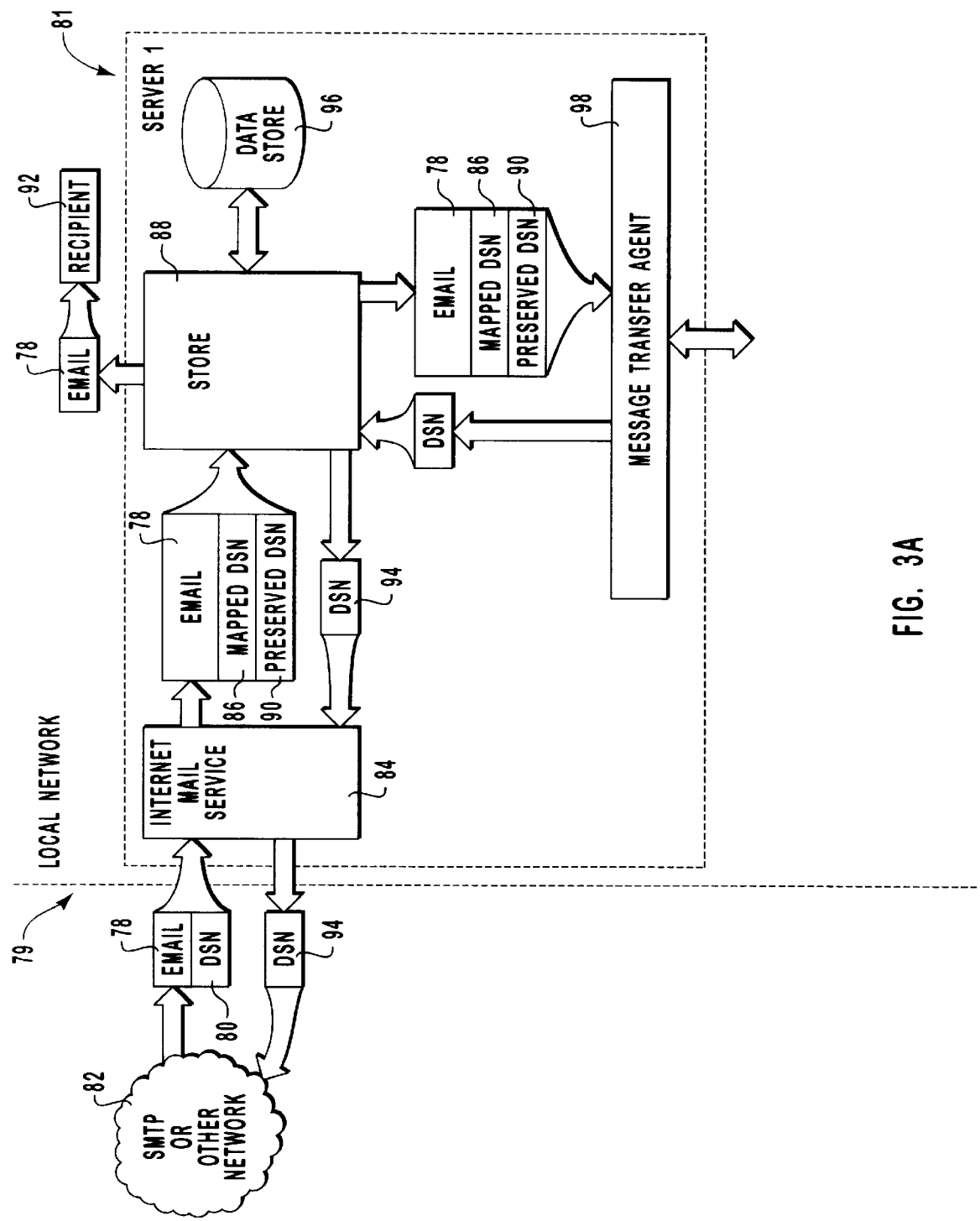
FIGS. 3A and 3B represents a top-level diagram of one embodiment of the present invention.
Figure 3B:
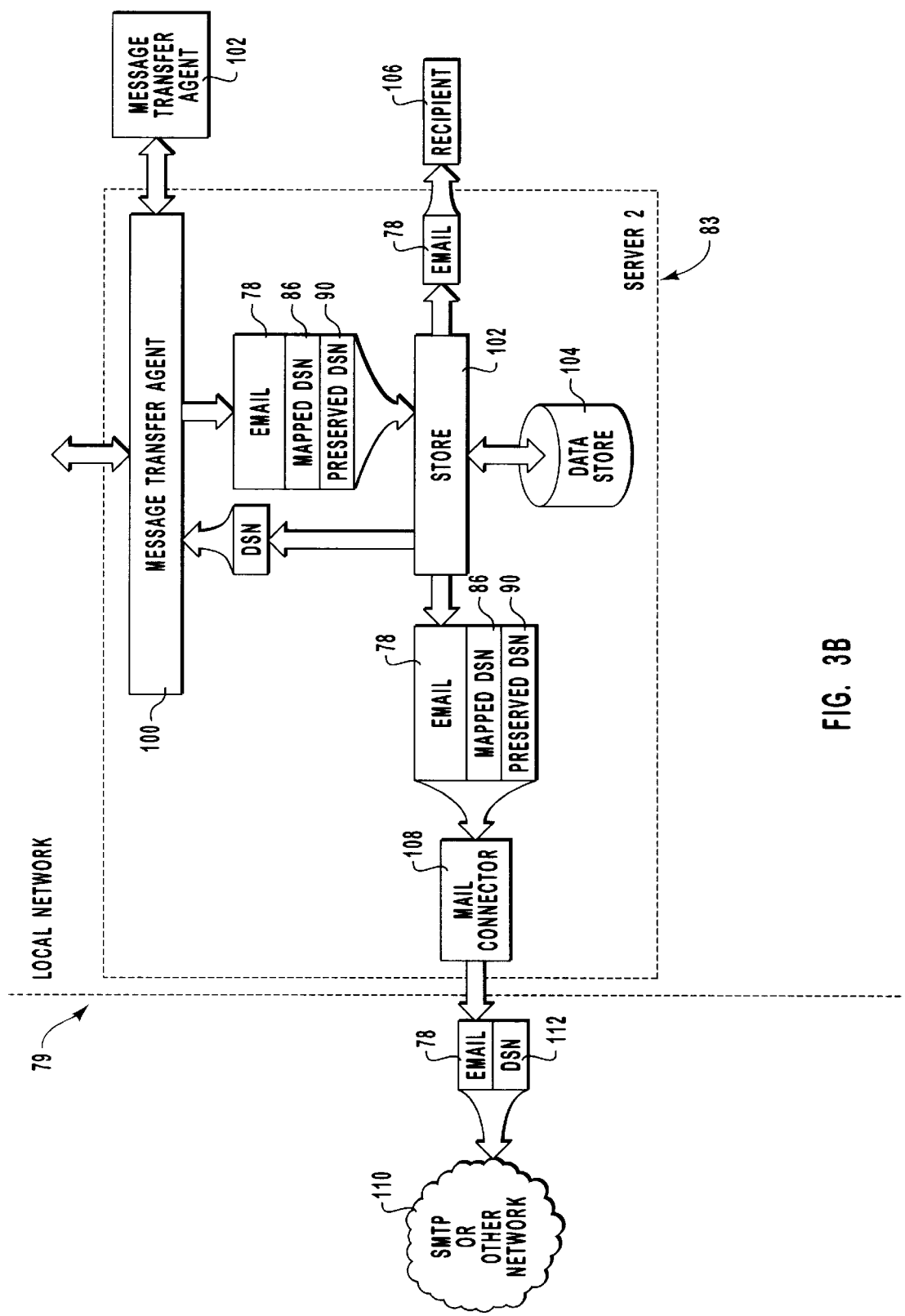

Referring next to FIGS. 3A and 3B, one embodiment of the present invention is presented. FIGS. 3A and 3B illustrate three networks. The first network 82 (FIG. 3A) is labeled as an SMTP or other network. As discussed in greater detail below, network 82 generates an email message, such as email message 78, which is transferred to a local network, shown generally in FIGS. 3A and 3B as 79. The email message may be delivered within local network 79 or may ultimately be forwarded to a third network, 110 (FIG. 3B). Local network 79 comprises two servers shown generally as 81 (FIG. 3A) and 83 (FIG. 3B). Each server may have a plurality of clients or recipients attached thereto. The illustrative clients are represented by recipient 92 (FIG. 3A) and recipient 106 (FIG. 3B). Network 79 may have additional servers as well.

In order to handle the email messages within local network 79, each server has networking and email software running thereon. In the embodiment illustrated in FIGS. 3A and 3B, the email software on each server contains three primary components. The first is an Internet mail service or other mail connector, a store, and a message transfer agent. In server 81, these three components are illustrated as Internet mail service 84, store 88, and message transfer agent 98. In server 83, these components are illustrated by mail connector 108, store 102, and message transfer agent 100. The functions of these various components will be discussed in greater detail below. In summary, however, the mail connector or Internet mail service provides an interface from the server into another network. The store is generally responsible for routing and delivery of email messages. The message transfer agent is responsible for transferring email messages between servers within the network. Such a network with this type of structure is representative, for example, of a Microsoft Exchange network. Microsoft Exchange is well known in the industry and many sources of documentation describing various details of Microsoft Exchange are readily available. In summary, however, Microsoft Exchange may be used to exchange and transfer email and other information within and among various servers in one or more networks.

In the embodiment illustrated in FIGS. 3A and 3B an email message, such as message 78 having associated DSN information 80 is generated by first network, such as network 82. The email message is forwarded to local network 79. As described below, the email message may be delivered within local network 79 or may ultimately be forwarded to other networks, such as network 110 of FIG. 3B. Accompanying email message 78 is DSN 80. As email message 78 is delivered within local network 79 and/or network 110, it is desirable to generate, as close as possible, the notifications requested by the original sender and described by DSN 80.

When a message is received from one type of network and transferred into another type of network, a mechanism must generally exist to provide a connection path or gateway between the two networks. Thus, embodiments within the present invention may comprise means for receiving a message from a first network and for providing the received message to a second network. By way of example, and not limitation, in FIG. 3A such means comprises Internet mail service 84. Internet mail service 84 represents an example of a mail connector or other gateway that is adapted to receive messages from one network and to provide the messages to another network. Embodiments of the present invention that connect to other types of networks or provide messages and other information to networks other than Exchange will have a different type of mail connector such as mail connector 108. All these are properly considered to be a mail connector or other means for receiving a message from a first network and providing the received message to another network. Various functions incorporated into Internet mail service 84, and/or mail connector 108 are discussed in greater detail below.

Internet mail service 84 and mail connector 108 are generally adapted to handle the various tasks that need to be performed when an email message is received from one type of network and provided to another type of network. In the context of the present invention, Internet mail service 84 may include functionality to map received DSN information 80 into the closest option supported by local network 79. Thus, embodiments within the scope of this invention may comprise means for mapping received delivery status information into the closest equivalent supported by a network. By way of example, and not limitation, such means may be incorporated into a mail connector such as Internet mail service 84 and/or mail connector 108. Such a means may also be incorporated into other program modules or components or implemented in a stand alone component. In the embodiment illustrated in FIGS. 3A and 3B, such a means for mapping may be incorporated into Internet mail service 84.

In FIG. 3A when Internet mail service 84 maps received DSN information 80 into the closest option supported by the local network 79 Internet mail service 84 stores mapped DSN information in a fashion that allows the mapped DSN to be transferred along with email message 78 and interpreted by the destination network in order to generate notifications that most closely match the options requested by the originator of email message 78. These mapped DSN properties are illustrated in FIGS. 3A and 3B by mapped DSN properties 86.

The exact mapping that occurs when DSN information 80 is received by Internet mail service 84 will be dependent upon the type of originating network, the options requested by the originator of the email message, and the type of destination network. By way of example, and not limitation, if the originating network is an SMTP network which implements RFC 1891, then both per-message and per-recipient delivery status notification information may accompany an email message. RFC 1891 defines four new parameters, two per-message and two per-recipient parameters. These per-message and per-recipient parameters are summarized in Tables 1 and 2 below.

TABLE 1

Per-Message Parameters Defined by RFC 1891

| Parameter | Value | Description |
|---|---|---|
| RET | FULL, HDRS | Determines whether the full message or just the headers are returned in a delivery status notification. This information is passed along to the next server. |
| ENVID | String | Specifies the Envelope ID for this message. This information is passed along to the next server and returned in a delivery status notification. |

TABLE 2

Per-Recipient Parameters Defined by RFC 1891

| Parameter | Value | Description |
|---|---|---|
| ORCPT | String | Specifies the original recipient (the address this message was originally sent to, before any list expansion, forwarding, etc.). Passed to the next server unmodified. |
| Notify | NEVER, SUCCESS, FAILURE, DELAY | Selects which delivery status notifications the originator wants to receive for this recipient. |

If local network 79 is an X.400 compliant network, such as a Microsoft Exchange network, then the network will have mechanisms that implement the concepts of 1) whether the full message or just a delivery report is returned in a delivery status notification, 2) whether a delivery report should be generated when a message is delivered, and 3) whether a non-delivery report is generated if a message is not delivered. These concepts may be implemented using three properties which may be set true or false to indicate various selected options. For example, a CONTENT_RETURN_REQUESTED property may be set true if full content of the message should be returned with a delivery status notification or false if only a delivery report is to be returned. An ORIGINATOR_DELIVERY_REPORT_REQUESTED property may be set true if an originator desires a receipt when a message is delivered. An ORIGINATOR_NON_DELIVERY_REPORT_REQUESTED property may be set true if a report is requested when a message is not delivered. In one embodiment of the present invention, SMTP property specified by RFC 1891 are mapped to Exchange properties as illustrated in Table 3.

TABLE 3

| SMTP PROPERTY | Value | X.400 Property Mapping |
|---|---|---|
| RET | FULL | CONTENT_RETURN_REQUESTED = True |
|  | HDRS | CONTENT_RETURN_REQUEST = False |
| NOTIFY | NEVER | ORIGINATOR_DELIVERY_REPORT_REQUESTED = False |
|  |  | ORIGINATOR_NON-DELIVERY_REPORT_REQUESTED = False |
|  | SUCCESS | ORIGINATOR_DELIVERY_REPORT_REQUESTED = True |
|  |  | ORIGINATOR_NON_DELIVERY_REPORT_REQUESTED = False |
|  | FAILURE | ORIGINATOR_DELIVERY_REPORT REQUESTED = False |
|  |  | ORIGINATOR_NON_DELIVERY_REPORT REQUESTED = True |
|  | DELAY | Not Mapped |

The mapping of Table 3 may also be used to map X.400 properties into SMTP equivalence, as explained in greater detail below.

A comparison of Tables 1, 2, and 3 illustrates that many of the SMTP DSN properties do not have corresponding X.400 properties. Using only the mapping in Table 3 would result in a loss of the unmapped information. If delivery of the message occurs within the destination network, such a mapping represents the closest options that are available. However, in many implementations it is not possible for a mail connector, such as Internet mail service 84, to identify whether ultimate delivery will take place within the destination network. This is because the task of the mail connector is rather narrow and involves only the receiving or transmitting of messages to and from the network and, possibly, any potential formatting or other translations that must occur in that process. Interpretation of recipients and delivery of messages to recipients is generally performed by other program modules. In some instances incoming messages may contain aliases that must be translated and distribution lists that must be expanded into multiple destinations, both inside and outside the local network before a final destination can be identified. Furthermore, many networks allow automatic forwarding of messages from one location to another. All these variations make it almost impossible for a mail connector to determine where final delivery will take place.

In order to prevent data loss when a message is be delivered outside of the local network, embodiments within the scope of this invention may comprise means for preserving received delivery status information so that the received delivery status information can be transferred within the destination network without being changed or causing delivery status notifications to be sent. By way of example, and not limitation, such means may be incorporated into a mail connector, such as Internet mail service 84 or mail connector 108. In the alternative, other program modules may be utilized. In FIG. 3, preserved DSN information is illustrated by preserved DSN information 90.

In many embodiments, preserving DSN information will require some form of encoding to place the DSN information in a format that can be readily interpreted in order to extract the original DSN information when desired yet allows the preserved DSN information to be transferred within the network without causing notifications to be generated. Thus, one example of a means for preserving may be an encoder or other program module that performs such a function. Other mechanisms may also be used to preserve received DSN information. Such other mechanisms may include, by way of example and not limitation, a program module or other component which stores the received DSN information in a database or other location where it can be retrieved when desired, a program module or other component that stores received DSN information in a property or other data structure that encapsulates or captures the DSN information so that it may be extracted when desired, or any other mechanism that maintains the DSN information unchanged and allows the DSN information to be associated with or transferred with the appropriate email message as it is moved throughout the destination network.

In the embodiment illustrated in FIGS. 3A and 3B, store 88 is responsible for, among other things, delivering an email message to a recipient. Thus, store 88 may contain various routing and delivery program modules necessary to ensure that an email message is either delivered to a recipient, or forwarded to other components for delivery to a recipient. Delivery of an email message to a recipient is illustrated, for example, in FIG. 3A by email message 78 being delivered to recipient 92. This represents an email message that is ultimately delivered to a recipient connected to or known by server 81. When store 88 delivers an email message to a recipient, such as recipient 92, if the email message has associated delivery status information, store 88 may generate a delivery status notification, such as delivery status notification 94, which is returned to the originating network as illustrated in FIG. 3A.

In addition to delivering messages to recipients, it may be desirable to save email messages and related information in a location where they may be retrieved at a later date. For example, if delivery of an email message is to take place to a remotely connected user or a mobile user, it may be necessary to temporarily save the email message until the user connects to the network. Embodiments within the scope of this invention may, therefore, comprise means for storing received delivery status information so that the received delivery status information can be retrieved at a later time. In FIG. 3A, such means for storing may be incorporated, for example, into store 88. In the embodiment illustrated in FIGS. 3A and 3B, store 88 may save information off to a data store, such as data store 96. Data store 96 may be a database, in the traditional sense of the word, or may be simply a location either in memory or on a mass storage device where information is stored until it needs to be retrieved. In one embodiment of the present invention, one or more program modules in store 88 act as a data store manager which provides an interface to data store 96. A component wishing to store information in data store 96 would submit the information to the appropriate program module and the program module would save the information to data store 96. Information may be retrieved in a similar manner. In one embodiment, such a data store program module is adapted to store any type of information submitted to it. Thus, it is possible to create new property information and store such information in data store 96 through such a program module.

As illustrated in FIGS. 3A and 3B, a server of the network 79 comprises a mail connector, such as Internet mail service 84 or mail connector 108, a store, such as store 88, and a message transfer agent, such as message transfer agent 98 or message transfer agent 100. These three components or program modules combine to provide all functionality necessary for receiving, transferring, and delivering email throughout network 79. As previously discussed, if a recipient is known or connected to a server, then the store will deliver the information to the recipient. However, in networks that have more than one server, messages may have to be forwarded to other servers for ultimate delivery. In FIGS. 3A and 3B this is illustrated by the transfer of messages from server 81 to server 83 through message transfer agent 96 and message transfer agent 100. In addition, messages may be transferred to additional servers through other transfer agents such as message transfer agent 102.

When an email message is to be forwarded to another server for ultimate delivery, store 88 may retrieve the email message and associated information from data store 96, performed any formatting changes necessary for proper transfer between transfer agents, and provide the appropriately formatted message to message transfer agent 98. Message transfer agent 98 will then transfer the message to other transfer agents as appropriate. In FIGS. 3A and 3B, for example, email message 78 along with mapped DSN 86 and preserved DSN 90 is forwarded via message transfer agent 98 and message transfer agent 100 to store 102 of server 83. Store 102 may contain identical functionality to store 88, saving information in data store 104 and delivering information to recipients, such as recipient 106, as appropriate.

In the embodiment illustrated in FIGS. 3A and 3B, messages may also be forwarded out of network 79 to another network, such as network 110. These email messages may originate within network 79 may have been originally received from another network. When a message is to be delivered to a recipient in another network, a server may forward messages to the network through an Internet mail service or other mail connector as appropriate. By way of example, FIG. 3B illustrates email message 78 being forwarded through mail connector 108 to network 110. If network 110 is an SMTP network, then mail connector 108 may be an Internet mail service, such as Internet mail service 84. If network 110 is a different type of network, then mail connector 108 represents an appropriate mail connector.

If an email message is transferred outside a network, the present invention provides for the mapping of delivery status notification information into an appropriate format supported by the targeted network. Such a mapping may take one of several forms. For example, if the email message originated within an SMTP network, has been forwarded through this network, and is destined for an SMTP network, then the mapping may utilize preserved DSN information received with the original message to recreate the original DSN options on the email message. As previously explained, this approach allows a message to transit a foreign network and return to the originating network with all delivery status notification information intact. Such an approach may be used not only with SMTP networks, but in any situation where a message originates with one type of network passes through a second type of network and then returns to the first type of network.

As email message 78 is forwarded by mail connector 108 to network 110, the mapping that takes place will be dependent upon where email message 78 originated. If email message 78 did not originate in the same type of network that it is passing into, then the mapping that occurs should be as close as possible to the original options requested by the sender. In general, if preserved DSN information 90 is available, such mapping should utilize preserved DSN information 90 in order to avoid any mapping losses that occurred when mapped DSN information 86 was created. In the alternative, if email message 78 originated within network 79, then preserved DSN information 90 may not exist and mapped DSN information 86 represents the original DSN information requested by the sender. In this situation, mapping may take place using the original DSN information. In either case, the general rule of using the original DSN information to perform the mapping is followed.

Figure 4A:
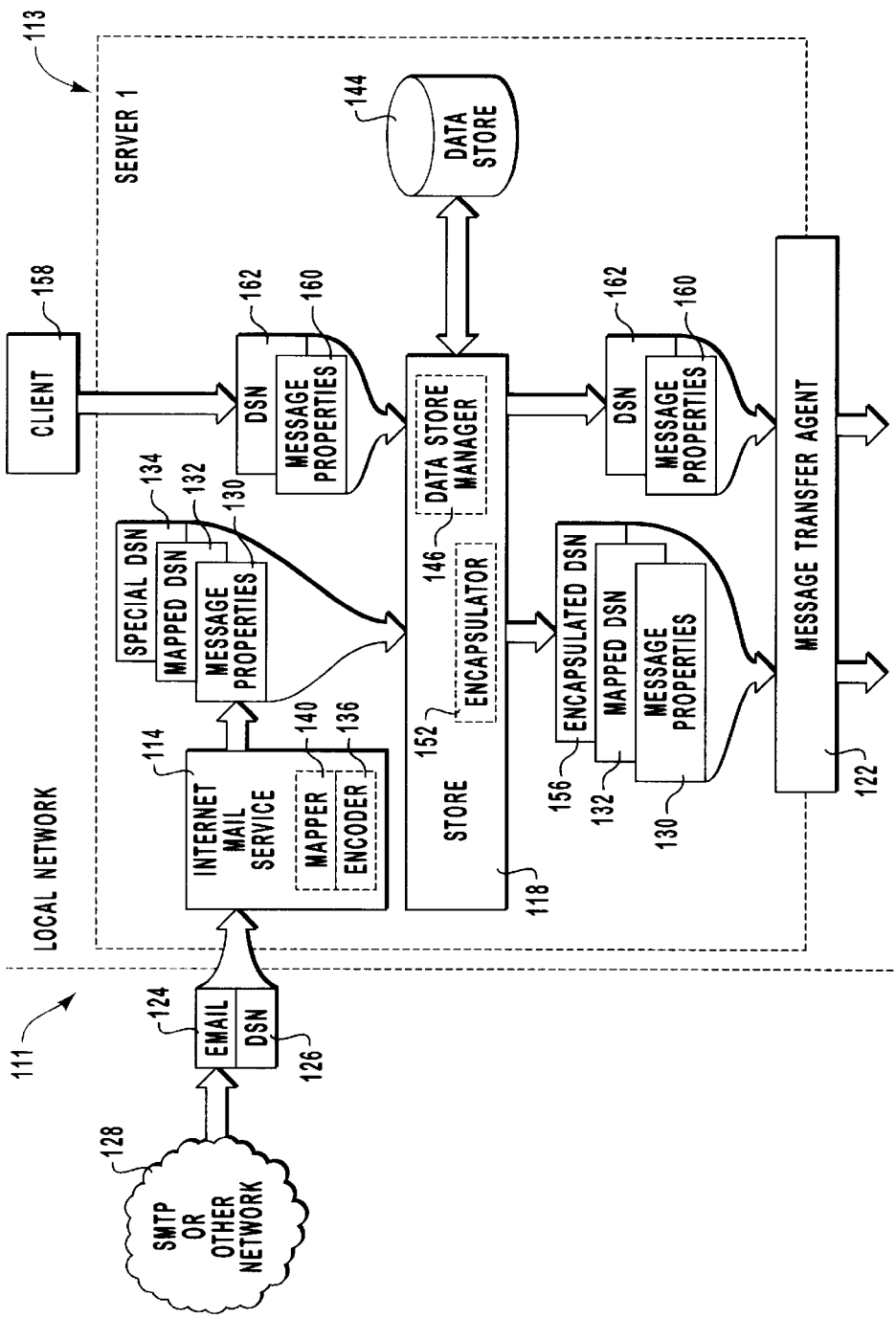
FIGS. 4A and 4B represents another embodiment of the present invention.
Figure 4B:
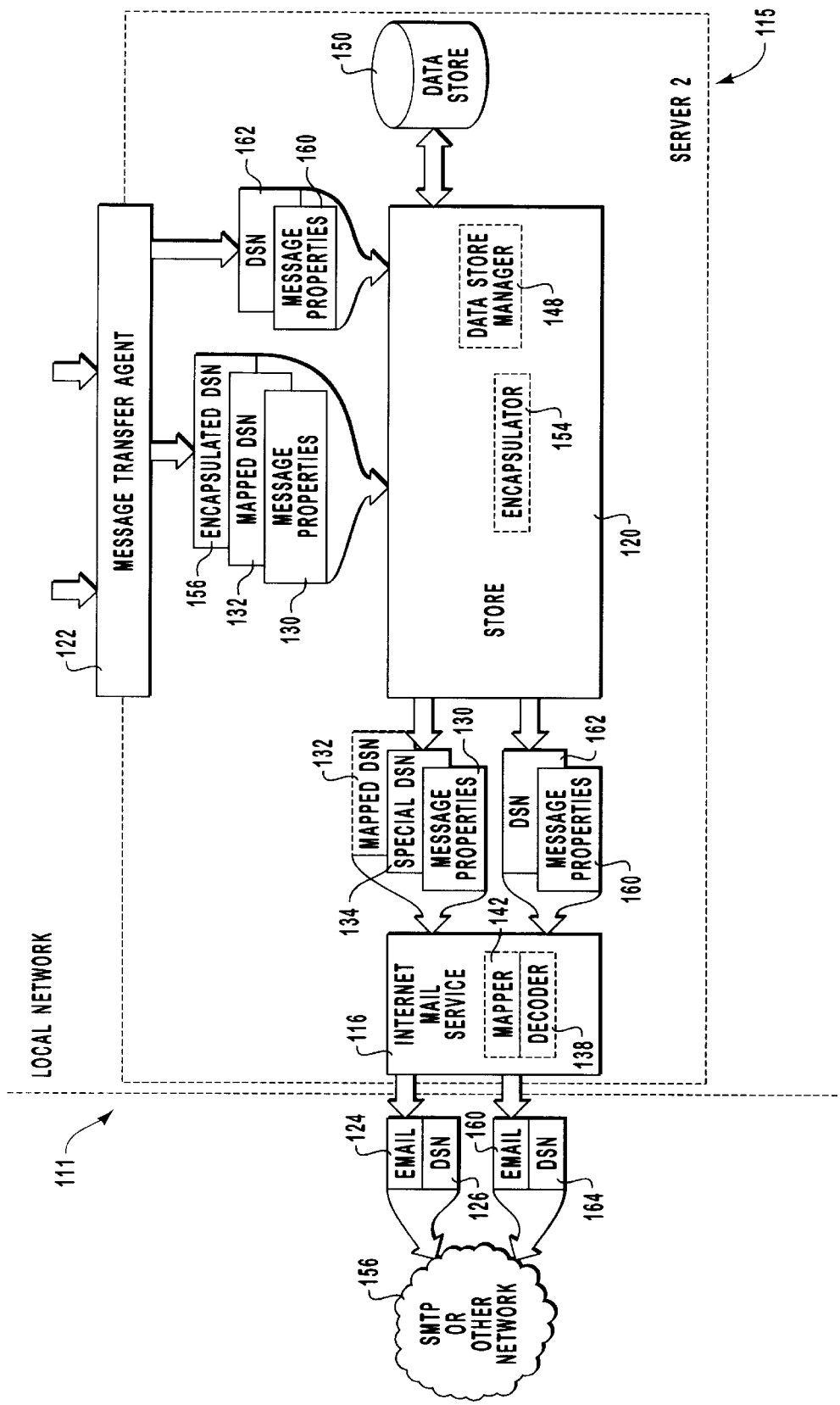

Turning now to FIGS. 4A and 4B, a more detailed explanation of one embodiment of the present invention is presented. The local network shown generally as 111 has two servers labeled server 1 shown generally as 113, and server 2 shown generally as 115. As in FIGS. 3A and 3B, each server comprises a mail connector, such as Internet mail service 114 and 116, store 1 and 120, and message transfer agent 122. Although only a single message transfer agent is illustrated, each server would most likely have its own message transfer agent and information would flow between the servers by communications through the message transfer agents.

The embodiment illustrated in FIGS. 4A and 4B shares many of the same characteristics as the embodiment illustrated in FIGS. 3A and 3B. For example, when an email message, such as email message 124, having accompanying delivery status notification information, such as DSN information 126, is received from a network, such as network 128, the message is received by a mail connector, such as Internet mail service 114. Internet mail service 114 represents yet another example of a means for receiving a message from one network and for providing the received message to another network. As previously discussed, Internet mail service 114 is only one example of a number of various mail connectors that may be used to connect the destination network to a desired other network. All such mail connectors are examples of means for receiving a message from one network and for providing the message to another network.

In the embodiment illustrated in FIGS. 4A and 4B, all portions of a message may conceptually be thought of as various properties. For example, a message may have one or more header properties that store such information as the originating sender, the path the message has traversed to this point, the destination or destinations of the message, and so forth. A message may also have a body property which carries the text of the message. In this model, delivery status notification information may also be thought of as one or more properties that are carried along as part of a message. Thus, when Internet mail service 114 receives email 124 it performs any necessary translation that allows the message to be placed in various properties supported by the destination network. In FIG. 4, these various properties are broken down into three general categories illustrated as message properties 130, mapped DSN properties 132, and special DSN properties 134.

Message properties 130 represent all of the message properties other than the delivery status notification properties. Mapped DSN properties 132 represents the mapping of DSN information 126 to the closest available options supported by network 111. Such a mapping may be performed by means for mapping the received delivery status information into the closest equivalent supported by the destination network. Such a means may be accomplished by any mechanism which maps received DSN information into the appropriate properties. In one embodiment, rules are used to map properties from an SMTP network to an X.400 network using the information in the tables previously discussed.

In order to perform the mapping according to designated rules, embodiments within the scope of this invention may comprise means for mapping received delivery status information into the closest equivalent supported by the destination network. By way of example, and not limitation, in FIG. 4 such means is illustrated by mapper 140 and mapper 142. Note that such a mapper may be adapted to perform a one-way mapping, as for example converting DSN information 126 into mapped DSN information 132 or, more likely, may be adapted to perform mapping in either direction.

Special DSN properties 134 represent properties supported by network 111 that are created for the express purpose of storing and preserving DSN information 126. The concept is to take the DSN information received by Internet mail service 114 and place the information into properties that may be stored and transferred by the destination network without causing the destination network to generate delivery status notifications. The received delivery status notification information must also be able to be extracted from special DSN properties 134 in a manner that allows complete reconstruction of the received delivery status notification information. In one embodiment preserving DSN information is performed by a means for preserving the received delivery status information so that the delivery status information may be transferred within the destination network without being changed or causing delivery status notifications to be sent. By storing received delivery status notification information in special properties designed and designated for such a purpose, the destination network may be adapted to handle the properties in a manner that achieves these goals.

An example of means for preserving is illustrated in FIG. 4A by encoder 136. Encoder 136 is responsible for interpreting DSN information 126 and creating special DSN properties 134. As discussed in greater detail below, such means for preserving may also comprise a decoder that can reverse the encoding process. Such a decoder is illustrated in FIG. 4B as decoder 138. Note that the decoder and encoder may be performed by a common program module or other component. Other mechanisms may also be used for the means for preserving. For example, received DSN may be stored in a database or other storage location and not in properties. The preserved DSN information may also be kept in a single location that is not transferred with the email message, but can be accessed to retrieve the preserved DSN information when desired.

Once the incoming email message has been placed in a form usable by the destination network, the message may be submitted to another component that is designed to deliver, or otherwise ensure that the message is passed to the next destination toward its ultimate delivery point. In FIG. 4A, such a component is illustrated by store 118. In the embodiment illustrated in FIGS. 4A and 4B, store 1is responsible for deciding how the message should be routed and what should be done with the message. As part of these decisions, message may be submitted to a data store, such as data store 144. Placement of the message of data store 144 may be temporary or more permanent depending upon the exact circumstances. If it is desired to store the message and its accompanying information in data store 144, embodiments within the scope of this invention may comprise means for storing received delivery status information so that it can be retrieved at a later time. By way of example, and not limitation, such a means is illustrated in FIGS. 4A and 4B by data store manager 146 and 148.

Data store manager 146 and 148 are simply meant to illustrate the mechanism for placing information into data store 144 and data store 150, respectively. Data store manager 146 and 148 also represent the mechanism used to retrieve information from data store 144 and data store 150 respectively. Data store manager 146 and 148 may be any mechanism by which these functions may be accomplished. For example, data store manager 146 and 148 may be a program module within store 118 or 120. In the alternative, data store manager 146 and 148 may reside in or make use of the I/O system to place data in the data store and retrieve data from the data store. Data store manager 146 and 148 may comprise a programmatic interface or other mechanism that can be accessed by other program modules in order to accomplish the desired functions. In the alternative, data store managers 146 and 148 may be separate program modules. All that is necessary is that the desired functions be able to be achieved. In one embodiment of the present invention, the data store manager is adapted to store any number or type of information, keep track of that information, and provide the information to a requesting client when desired. The information need not have any special format or be any special data type.

The approach of preserving DSN information 126 in special DSN properties 134 is sufficient if all components in the server are aware of the special properties that need to be carried along with the regular message. However, in some embodiments when messages are transferred between servers, protocols are used which require special properties that are not part of a standard message to be encapsulated in a way that they will be transferred without modification or interpretation. The embodiment in FIG. 4 represents but one example of such a system.

In the embodiment illustrated in FIGS. 4A and 4B, message transfer agent 122 communicates with other message transfer agents in order to transfer messages and other information between servers. If message transfer agent 122 has been developed to transfer specific properties as part of a message, it may be desirable to add an extension to the protocol used to transfer information between transfer agents in order to transfer an additional "blob" of data that is not interpreted by the message transfer agent but simply passed on and carried along with the message. Such an approach may be particularly useful for established protocols which encapsulate a message and its accompanying properties within an "envelope." Embodiments which require properties to be encapsulated may comprise means for encapsulating delivery status information when the delivery status information is transferred within the destination network. By way of example, and not limitation, in FIGS. 4A and 4B such a means is illustrated by encapsulator 152 and 154.

Encapsulator 152 and 154 are responsible for encapsulating special DSN properties 134 as they are sent to the message transfer agent 122 for transfer between servers. Encapsulators 152 and 154 also represent the mechanism by which encapsulated properties are extracted when they are received and the special DSN properties 134 recovered. Note that encapsulators 152 and 154 may not comprise separate program modules per say. Encapsulators 152 and 154 may be part of the transfer protocol that transfers information between and among servers within the destination network. It is illustrated separately in FIG. 4 simply to clarify the function that may be performed by such an embodiment. Note that although encapsulators 152 and 154 are shown as part of store 1and store 120, respectively, such functionality may also be incorporated in other program modules or components or split among several program modules or components. Encapsulated DSN properties 156 represent the encapsulated "blob" of DSN properties that are passed along with the message.

If a message received from an outside network, such as network 128, is to be passed through the destination network to yet another network, the message along with its associated DSN information will be forwarded to a mail connector, such as Internet mail service 116. In FIGS. 4A and 4B, this is represented by message properties 130, special DSN properties 134, and mapped DSN properties 132 being sent to Internet mail service 116. Note that depending on the implementation and the originating source of the email message, it may not be necessary to pass mapped DSN properties 132 to the mail connector. In some cases all DSN information may be recovered from special DSN properties 134. When the message is transferred out of the network, DSN information is mapped to the appropriate DSN options for the network where the message will be sent, such as network 156. As previously described, if network 128 and 156 are of the same type, then the DSN options originally specified by the sender may be recovered exactly through the use of special DSN properties 134. Such a recovery may, for example, be performed by mapper 142.

When a message originates within network 1that is to be passed to an outside network, the process is similar to that already described. In FIG. 4A, the generation of a message that will be sent to an outside network is illustrated by client 158 generating a message represented by message properties 160 and DSN properties 162. As with other messages in network 111, the message is submitted to a store, as for example store 118. The message may then be saved in data store 144 for temporary and/or more permanent storage. If the message needs to be forwarded to another server, message 160 and DSN 162 may be forwarded through message transfer agent 122 as illustrated in FIGS. 4A and 4B. Eventually, the message will be forwarded to the appropriate mail connector, as for example Internet mail service 116.

Internet mail service 116 will handle a message created by network 111 in much the same way that it handles messages that are forwarded through network 1and transferred outside. In other words, Internet mail service 111 will examine DSN properties 162 and map DSN properties 162 into the closest options supported by the target network. As in the case of other messages, this process may be performed by a means for mapping, as for example mapper 142. In FIG. 4B, when DSN properties 162 are mapped to the closest supported options, DSN properties 164 results.

In one embodiment, the network where a message will be sent is an SMTP network and when network 111 is an Exchange network, the information in Tables 1–3 are used to create a set of mapping rules that first checks to determine whether special DSN information is recovered and used. If not, then a mapping between DSN properties of network 1and the SMTP properties are created using the information in Table 3. More information regarding one implementation of DSN properties 134 is explained in conjunction with FIGS. 7A and 7B below.

Figure 5:
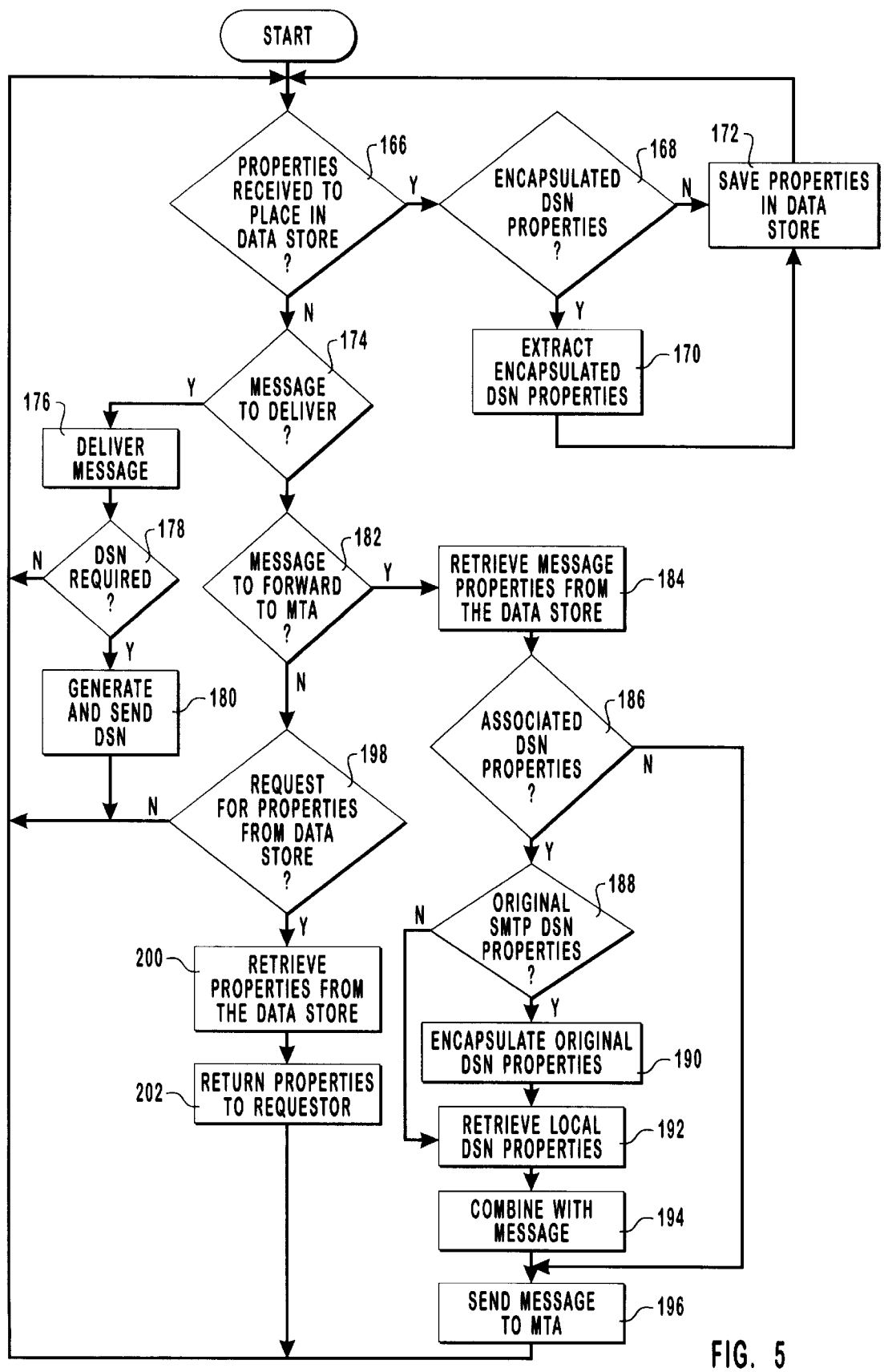
FIG. 5 illustrates one possible implementation of the store components illustrated in FIGS. 3A and 3B or FIGS. 4A and 4B.

Referring now to FIG. 5, the functionality of a store suitable for use in an embodiment such as that illustrated in FIGS. 3A and 3B or FIGS. 4A and 4B is discussed in greater detail. As previously described, the purpose of a store in the illustrated embodiments is to receive messages, place them into a data store or retrieve them from a data store as appropriate, deliver messages to destinations connected to the local server, and forward messages to other servers for ultimate delivery somewhere else. A store accomplishes these functions by interfacing with mail connectors and message transfer agents in the embodiments illustrated in FIGS. 3A and 3B and FIGS. 4A and 4B.

Processing in the representative store begins with decision block 166 which tests whether properties have been received that should be placed in the data store. If so, then the execution proceeds to decision block 168 where a test is made to determine whether the properties have been encapsulated. This decision block tests, for example, whether the store is receiving encapsulated DSN properties from a message transfer agent as previously described in conjunction with FIGS. 4A and 4B. If the properties are not encapsulated, then they are saved in the data store as illustrated by step 172. If the properties are encapsulated, then they are extracted as illustrated in step 170 and saved in the data store as illustrated in step 172. Step 170 represents another example of means for extracting encapsulated delivery status notification information. Such a means may be implemented by any mechanism which can strip off the encapsulation and extract the desired information.

Decision block 174 tests whether messages are available that should be delivered. If so, execution proceeds to step 176 where the message is delivered to the appropriate recipient. After delivery of the message to the appropriate recipient, decision block 178 tests whether delivery status notifications should be sent. If so then delivery status notifications are generated and sent in step 180. As previously described, the type of delivery status notifications that are sent and the events which will trigger a delivery status notification will be dependent upon the options supported by the network. For example, two common delivery status notifications are notification if the message has been delivered and notification if the message is not delivered. Thus, in step 176 if a message is delivered, then a delivery status notification may be generated and sent in step 180. If, on the other hand, delivery of the message at step 176 was unsuccessful, then in step 180 a non-delivery status notification may be generated and sent.

Decision block 182 determines whether a message exists that should be forwarded to the MTA for delivery to another server. If so, then step 184 retrieves the message properties from the data store, if they have been saved therein. Decision block 186 then tests whether the message has associated DSN information. If not, then the message is sent to the message transfer agent as illustrated by step 196. If, however, delivery status notification information accompanies the message, then decision block 188 tests whether the message has accompanying DSN properties that have been received from outside the network, as for example original SMTP DSN properties. If such properties do not exist, then it may be presumed that the message has originated somewhere within the network and not from an outside network. Execution thus proceeds to step 192 where local DSN properties are retrieved, combined with the message in step 194, and sent to the message transfer agent in step 196. If, however, the message has associated preserved original DSN properties, then execution proceeds to step 190 where the original DSN properties are encapsulated and then combined with local or mapped DSN properties, the message, and sent to the MTA as previously described. Obviously, if the network does not need to encapsulate original DSN properties to have them transferred along with the message without being interpreted by the network, then step 190 need not exist and all that is necessary is to retrieve the preserved original DSN information and to forward it to the MTA along with the mapped DSN properties and the remainder of the message.

Decision block 198 tests whether a request has been issued to retrieve properties from the data store. If not execution proceeds back to the start for the processing of the next event. If so, step 200 retrieves the properties from the data store and step 202 returns the properties to the requesting entity.

The embodiment illustrated in FIG. 5 represents but one example of a possible implementation of a store according to the embodiments of FIGS. 3A and 3B and FIGS. 4A and 4B. Other examples may also be possible. For instance, some of the functionality currently incorporated into FIG. 5 may be broken out of the store and placed in another program module. In some networks, not all of the functionality illustrated in FIG. 5 may be required.

Figure 6:
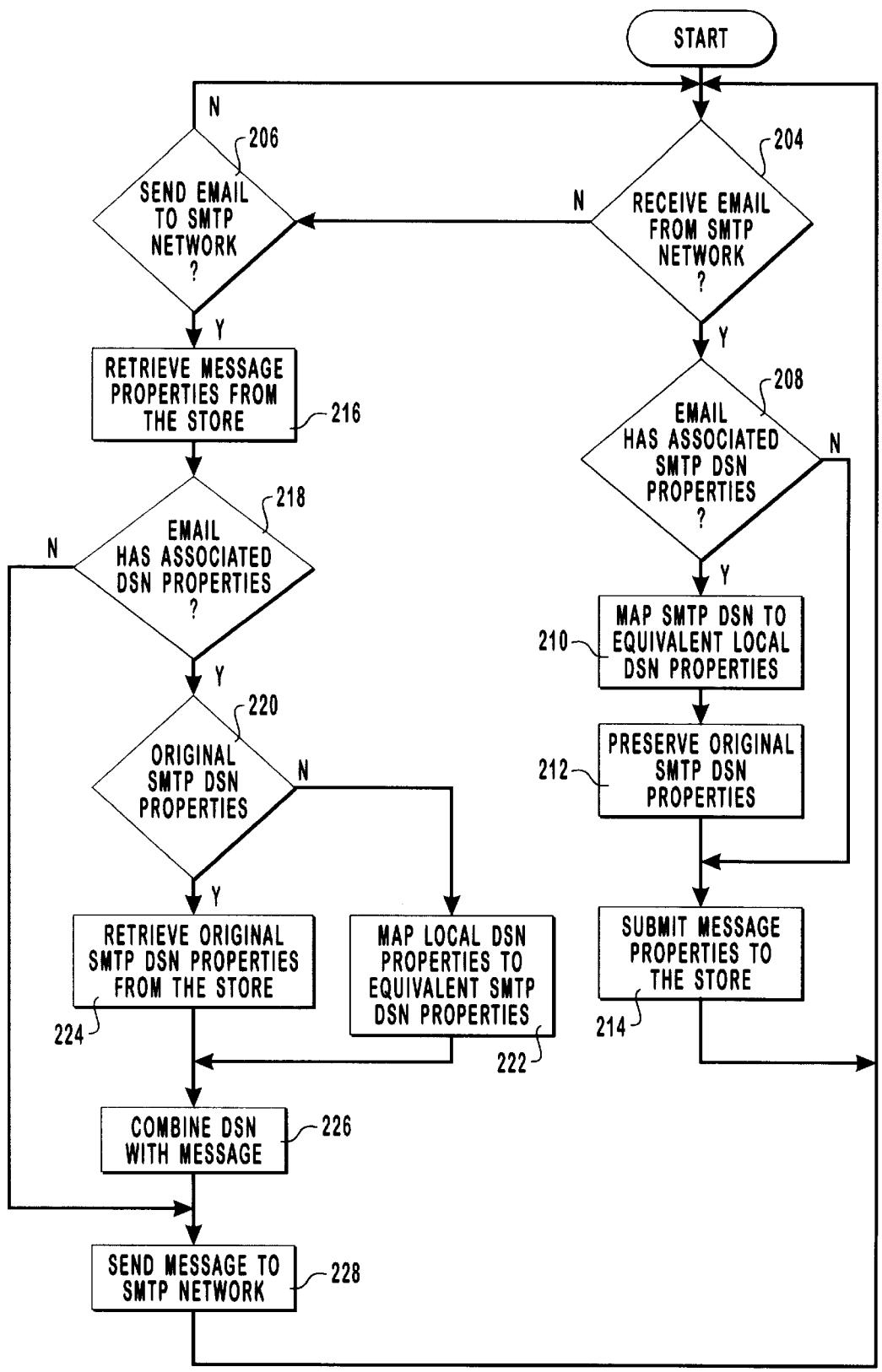
FIG. 6 illustrates one possible embodiment of the Internet mail service components of FIGS. 3A and 3B or FIGS. 4A and 4B.

Turning now to FIG. 6, a representative example of a mail connector is illustrated. The mail connector of FIG. 6 illustrates an Internet mail connector that connects to an SMTP network, however similar structure may be provided for any other network. The functionality for other types of mail connectors is basically the same and thus FIG. 6 should be taken as representative, and not limiting of the scope of this invention.

Processing begins with decision block 204 which determines whether an email message has been or should be received from the SMTP network. If not, execution proceeds to decision block 206 where a test is made whether a message exists that should be sent to the SMTP network. If not then execution proceeds back to start to wait until one of these events occurs.

If an email message is received from the SMTP network, execution proceeds to decision block 208 which tests whether the message has associated SMTP DSN properties. If not, then the message may be translated as appropriate and submitted to the store as indicated by step 214. If, however, SMTP DSN properties are associated with the received email message, then it is necessary to map the SMTP DSN properties to the equivalent local DSN properties as indicated by step 210. Step 210 represents yet another example of the means for mapping received DSN properties to the closest supported options. Step 210 may proceed in accordance with the rules discussed above in conjunction with Tables 1–3. Step 212 then preserves the original SMTP DSN properties. As explained in greater detail below, this may involve the encoding of received DSN properties into properties of the present network that will be transferred along with the message but will be ignored as far as generating any delivery status notifications. Other mechanisms, such as those previously discussed, may also be used to preserve the original DSN properties. The properties are then submitted to the store as illustrated by step 214.

When the Internet mail service has an email message to send to the SMTP network, execution proceeds to step 216 where message properties are retrieved from the store. The store may have saved the message properties in the data store or may be passing the message properties directly to the Internet mail service.

Execution then proceeds to decision block 216 where a test is made to determine whether the email message has associated DSN properties. If the message has no associated DSN properties, then the email message may be sent to the SMTP network as indicated by step 228. In the alternative, in order to more fully comply with RFC 1891 it may be desirable to create DSN properties specifying that no delivery receipt should be returned. As yet another alternative, if a message has no associated DSN properties, it may be desirable to create DSN properties that generate non-delivery report. If the message has associated DSN properties, execution proceeds to decision block 220 where a determination is made as to whether the message original SMTP DSN properties associated therewith. If so, then step 224 retrieves the original DSN properties and recreates the SMTP DSN information. Step 224 represents another example of means for decoding DSN properties to extract the original DSN properties preserved therein. If no original SMTP DSN properties exist, then execution proceeds to step 222 where the local DSN properties are mapped into the equivalent SMTP DSN properties. Step 222 represents yet another example of means for mapping, as previously described. In the alternative, if the message came from one type of network and is being forwarded to an SMTP network, the message may have original non-SMTP DSN properties. In this situation, these original non-SMTP properties should be mapped to the closest equivalent SMTP DSN properties. This step would thus take the place of step 222. After the proper DSN information has been generated, the DSN information is combined with the message in step 226 and sent to the SMTP network as illustrated in step 228.

Figure 7B:
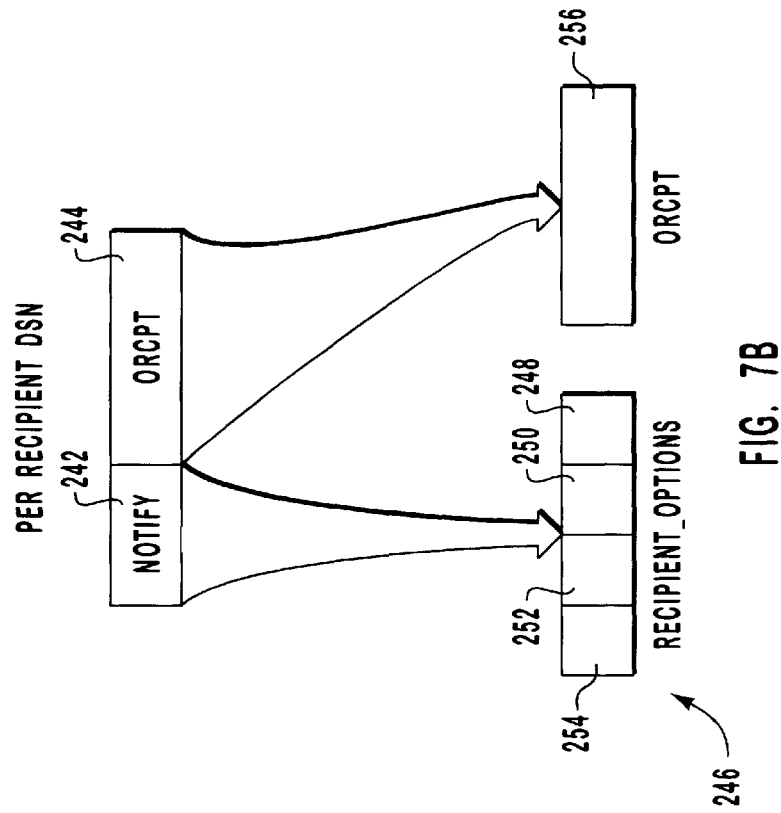
FIGS. 7A and 7B illustrate the preservation of per-message and per-recipient delivery status notification information that occurs in one embodiment of the present invention.
Figure 7A:
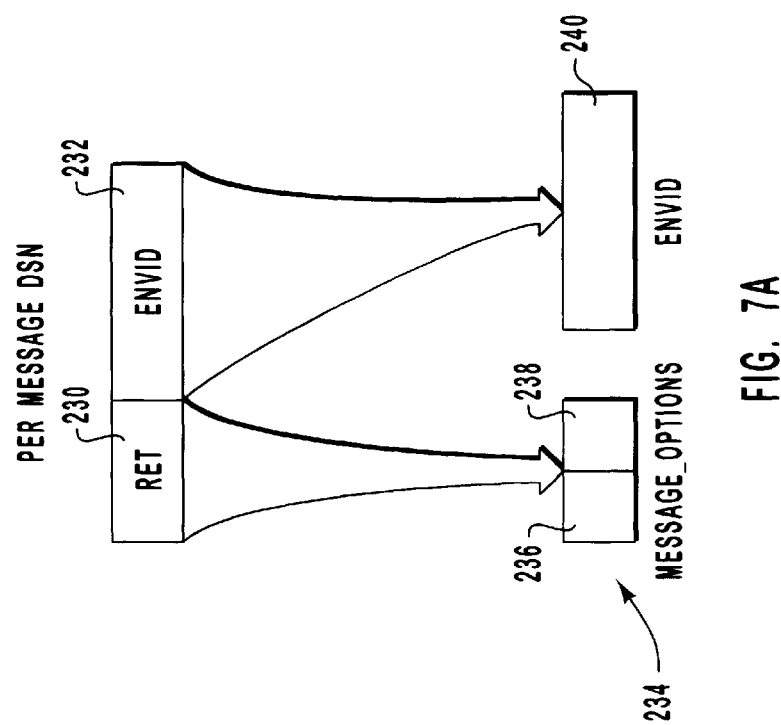

Turning now to FIG. 7A, one example is presented illustrating how per-message DSN information for an SMTP network may be preserved by storing it in specific X.400 properties, as previously described above. As previously illustrated in Table 1, RFC 1891 defines an RET and an ENVID properties on a per-message basis. The RET parameter may take on two values while the ENVID parameter is a string. In one embodiment, to preserve this information RET is encoded into a property, labeled MESSAGE_OPTIONS 234 having two bits 236 and 238. As illustrated in Table 1, RET 230 may take on one of two values. In one embodiment, these two values are encoded so that if neither bit 236 nor bit 238 are set, then the parameter is undefined. If bit 238 is set and bit 236 is clear then RET equals full, and if bit 236 is set and bit 238 is clear, then RET equals HDRS. ENVID string 232 is simply stored in a string property, labeled in FIG. 7A as ENVID 240.

Referring now to FIG. 7B, the per-recipient DSN information described in Table 2 is mapped to RECIPIENT_OPTIONS property 246, having three bits 248, 250, and 252. As illustrated in Table 2 above, notify may have four options that are not necessarily mutually exclusive. These values are Never, Success, Failure, and Delay, as previously described in Table 2. These options are mapped into four bits, one for each of Never, Success, Failure, and Delay, illustrated in FIG. 7B as 248, 250, 252, and 254. The absence of options is encoded by setting all four bits to zero. The mapping process prevents Never from being set if any of Success, Failure, or Delay are set, and vice-versa. ORCPT string 244 is simply preserved in ORCPT string 256 as illustrated in FIG. 7B.

In summary, the present invention provides systems and methods for preserving delivery status notification information as a message transits from one network into another network and, possibly, out of the network to yet a third type of network. This is accomplished by taking a two-pronged approach. When a message enters the network, the delivery status notification information is mapped to the closest option supported by the network. In addition, the delivery status notification information is preserved in a manner that allows the information to be fully recovered should the message transit out of the network at a later point in time.

The mapped delivery status notification information is used to generate delivery status notifications for deliveries that occur within the network. The preserved delivery status notification information is used to restore the original delivery status notification options if the message transits out of the network back into the same type of network that it originated from. If the message transits into a network different from the originating network, then the preserved delivery status notification information may be used to map the originally requested options into the closest options supported by the network. Whenever a mapping is performed, it is generally preferable to map from the original delivery status notification options requested by the sender. Only when such original options are not available should mapped options typically be used. For messages that originate within the network and then transit out of the network to a different network, the delivery status notification options selected by the sender are used to select the closest available options.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for transferring and preserving delivery status notification information that is sent from a first network into a second network comprising the steps of:

receiving an e-nail message from said first network having associated therewith delivery status notification information that identifies a return notification that should be returned to the sender upon occurrence of at least one specific event relating to the status of delivery of the message;

mapping the received delivery status notification information into the closest delivery status notification option supported by said second network and storing said mapped delivery status notification information in order to permit said second network to generate the return notification should said at least one specific event take place within said second network; and preserving the original delivery status notification information received from the first network by encoding it at the second network and by associating the encoded deliver status notification information in a fashion that will permit the encoded delivery status notification information to be transparently transferred along with the associated message without causing the second network to act on the encoded delivery status notification information.

2. A computer-readable medium having computer-executable instructions encoded thereon for implementing a method for transferring and preserving delivery status notification information that is sent from a first network into a second network and wherein the method is comprised of the steps of:

receiving an e-mail message from said first network having associated therewith delivery status notification information that identifies a return notification that should be returned to the sender upon occurrence of at least one specific event relating to the status of delivery of the message;

mapping the received delivery status notification information into the closest delivery status notification optional supported by said second network and storing said mapped delivery status notification information in order to permit said second network to generate the return notification should said at least one specific event take place within said second network; and preserving the original delivery status notification information received from the first network by encoding it at the second network and by associating the encoded delivery status notification information in a fashion that will permit the encoded delivery status notification information to be transparently transferred along with the associated message without causing the second network to act on the encoded delivery status notification information.

3. A method as defined in claims 1 or 2 further comprising the step of comparing the received delivery status notification information to the delivery status notification options supported by said second network in order to identify the mapping that should take place.

4. A method as defined in claims 1 or 2 wherein said encoding step is performed when said message is transferred within said second network.

5. A method as defined in claims 1 or 2 wherein the step of preserving the received delivery status notification information so that the original delivery status notification information can be retrieved unchanged comprises the step or storing the received deliver status notification information.

6. A method as defined in claim 5 wherein said received delivery status notification information is stored in a database.

7. A method as defined in claims wherein if said message is transferred out of said second network then performing at least the step of retrieving said stored delivery status notification information and placing said retrieved delivery status notification information with said message so that said delivery status notification accompanies said message out of second network.

8. A method for transferring and preserving delivery status notification information that is sent from a first network into a second network comprising the steps of;

receiving an e-mail message from said first network having associated therewith delivery status notification information that identifies a return notification that should be returned to the sender upon occurrence of at least one specific event relating to the status of delivery of the message;

mapping the received delivery status notification information into the closest delivery status notification option supported by said second network and storing said mapped delivery status notification information in order to permit said second network to generate the return notification should said at least one specific event take place within said second network; and saving the original delivery status notification information received from the first network so that the original delivery status notification information can be recovered and returned to the same state as it was when received from said first network.

9. A computer readable medium having computer executable instructions for implementing a method for transferring and preserving delivery status notification information that is sent from a first network into a second network comprising the steps of:

receiving an e-mail message from said first network having associated therewith delivery status notification information that identifies a return notification that should be returned to the sender upon occurrence of at least one specific event relating to the status of delivery of the message;

mapping the received delivery status notification information into the closest delivery status notification option supported by said second network and storing said mapped delivery status notification information in order to permit said second network to generate the return notification should said at least one specific event take place within said second network; and saving the original delivery status notification information received from the first network so that the original delivery status notification information can be recovered and returned to the same state as it was when received from said first network.

10. A method as defined in claims 8 or 9 further comprising the step of transferring said message within said second network.

11. A method as defined in claim 10 further comprising the step of retrieving said saved delivery status notification information and encoding said saved delivery status notification information so that said saved delivery status notification will accompany said message as it is transferred within said second network without modifying said encoded delivery status notification information.

12. A method as defined in claim 11 wherein said mapping step occurs according to a predetermined mapping table that maps received delivery status notification information to the closest equivalent delivery status notification option supported by said second network.

13. A method as defined in claim 12 wherein if said message is transferred out of said second network then performing at least the step of the retrieving said received delivery status notification information and placing said received delivery status notification information with said message so that said delivered status notification information accompanies said message out of said second network.

* * * * *

UNITED STATES PATENT AND TRADEMARK OFFICE
CERTIFICATE OF CORRECTION

PATENT NO. : 6,163,809
DATED : December 19, 2000
INVENTOR(S) : David Buckley

It is certified that error appears in the above-identified patent and that said Letters Patent is hereby corrected as shown below:

Title page,
After "Primary Examiner" change "Mark H. Flinehart" to -- Mark H. Rinehart --

Column 2,
Line 34, before "to the" change "works" to -- work --

Column 4,
Line 27, after "from the" change "deliver" to -- delivery --

Column 5,
Line 13, after "3B" change "represents" to -- represent --
Line 15, after "4B" change "represents" to -- represent --
Line 52, after "can" and before "accessed" insert -- be --

Column 6,
Lines 10-11, after "minicomputers" change "mair-ame" to -- main-frame --
Line 51, after "memories" chenge "(ROM)" to -- (ROMS) --

Column 11,
Line 58, after "is" and before "be" insert -- to --

Column 14,
Line 20, after "store" change "land" to -- 118 and --

Column 15,
Line 46, after "means" change "for" to -- of --
Line 58, after "store" change "1is" to -- 118 is --
Line 61, before "may be" change "message" to -- messages --

Column 16,
Line 7, after "also" change "represent" to -- represents --
Line 63, after "per" change "say" to -- se --

Column 17,
Line 2, after "store" change 1and" to -- 118 and --
Line 28, after "network" change "1that" to -- 111 that --
Line 44, after "network" change "1and" to -- 111 that --
Line 45, after "service" change "111" change -- 116 --
Line 59, before "the" change "1and" to -- 111 and --

UNITED STATES PATENT AND TRADEMARK OFFICE
CERTIFICATE OF CORRECTION

PATENT NO.    : 6,163,809
DATED         : December 19, 2000
INVENTOR(S)   : David Buckley It is certified that error appears in the above-identified patent and that said Letters Patent is hereby corrected as shown below:

Column 19,
Line 62, after "block" change "216" to -- 218 --

Column 21,
Line 33, after "an" change "e-nail" to -- e-mail --
Line 59, before "status" change "deliver" to -- delivery --

Column 22,
Line 3, before "supported" change "optional" to -- option --
Line 29, after "step" change "or" to -- of --
Line 30, after "received" change "deliver" to -- delivery --
Line 34, after "in" change "claims" to -- claim 5 --
Line 39, after "out of" insert -- said --
Line 43, after "steps" change "of;" to -- of: --

Column 24,
Line 18, after "said" change "delivered" to -- delivery --

Signed and Sealed this

Fourth Day of December, 2001

Attest:

*Nicholas P. Godici*

NICHOLAS P. GODICI
*Attesting Officer*     *Acting Director of the United States Patent and Trademark Office*